Apr. 24, 1923. 1,452,817

V. RETTERATH

LINK

Filed June 30, 1920

Inventor:
Valentin Retterath
By his Attorneys

Patented Apr. 24, 1923.

1,452,817

UNITED STATES PATENT OFFICE.

VALENTIN RETTERATH, OF DRESDEN-COSSEBAUDE, GERMANY, ASSIGNOR TO THE FIRM: DEUTSCHE WERKE AKTIENGESELLSCHAFT, OF BERLIN, GERMANY.

LINK.

Application filed June 30, 1920. Serial No. 393,219.

*To all whom it may concern:*

Be it known that I, VALENTIN RETTERATH, a citizen of the German Republic, residing at Dresden-Cossebaude, Germany, have invented certain new and useful Improvements in Links, of which the following is a specification.

My invention refers to links or joints and more especially to ball and socket links for axles, shafts, artificial limbs and the like, its particular object being a link of superior efficiency.

The link forming the object of the present invention belongs to that class which employs spherical bodies for joining two parts such as the ends of two shafts together, and for centering them around a common centre, while the transmission of rotary movement from one shaft to the other is effected by jaws formed on the said ends, said jaws being interlocked after the manner of teeth. Links of this kind present a number of drawbacks. First of all, the jaws or teeth have to be kept rather thin in order to render an angular movement of the shafts possible; for in executing such a movement the free ends of the jaws of one shaft lying within that angle will get in the way of the bases of the jaws of the other shaft. In consequence thereof the jaws render a faultless transmission of the rotary movement possible only at a small angle, whereas at a greater angle the position of the flanks of the jaws at the point of contact will soon approach the direction of rotation of the driving shaft so far that the component which operates to turn the driven shaft is rendered ineffective and may even disappear entirely. Moreover in transmitting a rotary movement only one of the jaws is operative and can take part in the power transmission. This may even lead to disturbances in so far as the ends of both shafts will acquire the tendency of evading the working pressure whereby the jaws on the two parts lose their common centre. In consequence thereof the individual jaws are forced to give up their intimate contact with the spherical body and are placed under a bending stress in a radially outward direction. This will cause the ball to get loosened, and it has proved impossible to counteract these influences effectively by adjusting or retouching.

The principal objects of this invention are to provide a structure which will overcome the defects in the structures heretofore referred to, which can transmit the rotation from one shaft to another when the angle between the shafts is greatly increased without subjecting the jaws to severe radial bending stress and the jaws of which can be quickly and easily adjusted whenever necessary or desirable.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Fig. 1 is a longitudinal section of the end of the shaft provided with spherical surfaces, while

Figure 5:
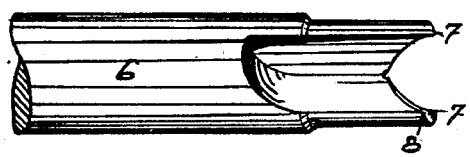
Fig. 5 is a perspective view of the tool employed in forming the spherical surfaces.
Figure 6:
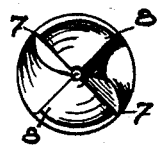
Fig. 6 is a front view of same.

As shown in the drawings, 1 indicates the end of one shaft or member which is provided at its end with a substantially spherical surface 5 which is formed on the end of the shaft by means of the tool 6 shown in Figs. 5 and 6. The tool is rotated about its longitudinal axis in the manner of the ordinary drill while the shaft is rotated in the plane of its longitudinal axis about an axis passing through the center of the spherical surface to be formed. In other words, referring to Fig. 1 of the drawing the shaft would be rotated in the plane of the paper about an axis perpendicular to the paper and passing through the center of the sphere indicated by the numeral 5. The diameter of the tool 6 is less than that of the shaft 1 so that a pair of flanges 4 are formed on opposite sides of the spherical surface 5 which obviously would be formed by the concaved cutting edges 7. These cutting edges are ground off as at 8 to provide the proper clearance to insure a cutting action of the tool and the circumference of the drill is also preferably backed off to insure side clearance in the manner usually employed in the common form of machine twist drills.

Figure 3:
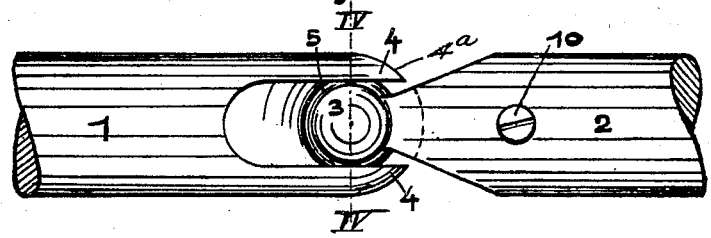
Fig. 3 shows the two parts interlocked with each other.
Figure 4:
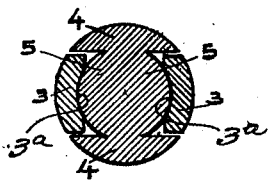
Fig. 4 is a cross section on the line IV—IV (Fig. 3).

The other shaft or member 2 is slotted at its end to form a pair of jaws 3, the sides of which are of circular configuration as clearly shown in Fig. 3 of the drawing and each of the inner faces of which is provided with a concaved recess 3ᵃ. The faces of these recesses are formed upon a radius of curvature equal to the radius of the sphere and when the parts are assembled as shown in Fig. 3, the center of curvature of this radius is coincident with the center of curvature of the spherical surface 5. The ends of the flanges 4 are rounded off in the direction transverse to the inner faces of the jaws, as clearly shown in Fig. 3, forming a spherical surface, the radius of which is equal to the diameter of the shaft and the center of which coincides with the center of the spherical surface 5.

Figure 1:
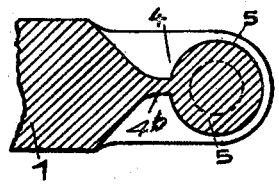
Figure 2:
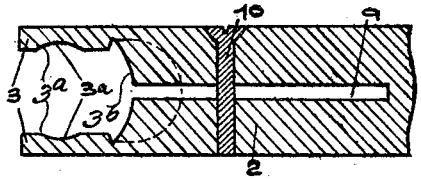
Fig. 2 is a similar section of the end of the shaft provided with the jaw-socket.

The shaft 2 is provided with a recessed portion 3ᵇ at the base of the jaws 3 to provide a clearance for the passage of the ends 4ᵃ of the flanges as shown in Figs. 2 and 3, and it will be noted by referring to Fig. 1 that the spherical surface 5 is continued almost entirely around in the longitudinal direction of the shaft leaving only a small web or wall 4ᵇ at the central part of the shaft. It will thus be seen that the shafts 1 and 2 may be inclined at a very great angle to each other, the limit of which is reached only when the ends of the jaws 3 contact with the web 4ᵇ.

The shaft 2 is centrally slotted as at 9 to a substantial distance from the bases of the jaws 3 and parallel to the faces thereof, an adjusting screw 10 passing transversely across the slot to provide a means to adjust the jaws 3 as desired to the spherical surface 5.

The link or ball-and-socket joint described offers the advantage that in the case where the two parts take up an angular position relatively to each other, the rear portions of the abutments 4 adjoining the spherical surfaces and the bases of the jaws remain unaffected and may therefore be formed parallel to the axes of the shafts and better still broadening in a rearward direction. It is even possible to shape them after the rules of shaping teeth and toothed wheels. The component which operates to turn the driven part is great enough to be effective and the turning may take place at a far greater angle. Although only two jaws are provided, the contact of the co-acting flanks takes place always at points disposed exactly or at least very nearly diametrically opposite each other and there is no danger of the spherical body getting loose as it forms a rigid part of the shaft. In consequence of the particular form of the flanks co-operating with each other the working pressure merely acts to press the jaws more tightly around the spherical surfaces. Moreover the number of parts is reduced to two, these being the shafts which are to be linked to each other. The slot provided in the shaft carrying the jaws renders these latter resilient to a certain degree, thus offering a chance of adjusting or retouching the co-operating parts.

It will be understood that the construction herein disclosed is also applicable to the construction of flexible shafts.

I claim:

1. A ball-and-socket joint comprising a member formed at one end with parallel flanges and with a ball located between said flanges and integral therewith, and another member provided at one end with jaws having opposing spherically curved socket surfaces in engagement with said ball.

2. A ball-and-socket joint comprising a member having a ball at one end, and a companion member split at one end to form socket jaws embracing said ball, a screw connecting said jaws on the side distant from the first-named member and said first named member provided with means to engage said jaws whereby a rotary motion is adapted to be transmitted from one of said members to the other.

3. A ball-and-socket joint comprising two members having cylindrical outer surfaces, one of said members having longitudinal spaced flanges at one end and a ball between the said flanges, while the companion member has opposing jaws fitted between said flanges and having spherically-curved inner surfaces or sockets engaging said ball, the center of curvature of said sockets co-inciding with the center of curvature of said ball.

4. A two part ball-and-socket joint comprising a member having a spherical surface adjacent the end thereof, and a companion member provided with spherical surfaces of substantially the same curvature adapted to embrace the first named surface, said members being provided with interengaging means adjacent to said surfaces for transmitting rotary motion from one of said members to the other.

5. A ball-and-socket joint comprising a member provided with parallel flanges and a spherical surface located between said flanges and integral therewith, and another member provided with jaws having opposing spherically curved socket surfaces adapted to engage said ball, said members being provided with recesses adjacent to said spherical surfaces to provide clearance for said flanges and jaws when said members are angularly inclined to each other.

In testimony whereof I affix my signature.

VALENTIN RETTERATH.